US008966245B2

(12) United States Patent
Aday et al.

(10) Patent No.: US 8,966,245 B2
(45) Date of Patent: Feb. 24, 2015

(54) SYSTEM AND METHOD FOR ASSIGNING QUALITY TO CRYPTOGRAPHIC IDENTITIES USED IN A DIGITAL TRANSACTION

(75) Inventors: Michael A. Aday, Bellevue, WA (US); Bryan M. Willman, Kirkland, WA (US)

(73) Assignee: Microsoft Technology Licensing, Inc., Redmond, WA (US)

( * ) Notice: Subject to any disclaimer, the term of this patent is extended or adjusted under 35 U.S.C. 154(b) by 1091 days.

(21) Appl. No.: 10/769,314

(22) Filed: Jan. 30, 2004

(65) Prior Publication Data

US 2005/0172335 A1 Aug. 4, 2005

(51) Int. Cl.
*H04L 29/06* (2006.01)
*G07F 7/08* (2006.01)
*G06Q 20/38* (2012.01)
*G06Q 20/40* (2012.01)
*G06F 21/33* (2013.01)
*G06F 21/64* (2013.01)

(52) U.S. Cl.
CPC ............ *G07F 7/08* (2013.01); *G06Q 20/38215* (2013.01); *H04L 63/0823* (2013.01); *G06F 21/33* (2013.01); *G06F 21/64* (2013.01); *G06Q 20/4016* (2013.01); *G06Q 20/4037* (2013.01)
USPC ........................................................ 713/156

(58) Field of Classification Search
CPC ... G06F 21/33; G06F 21/64; G06Q 20/38215; H04L 9/3268; H04L 63/0823
USPC .................. 726/10; 705/4; 713/156
See application file for complete search history.

(56) References Cited

U.S. PATENT DOCUMENTS

| | | | | |
|---|---|---|---|---|
| 6,212,635 B1 * | 4/2001 | Reardon | ...................... | 713/165 |
| 6,324,645 B1 * | 11/2001 | Andrews et al. | ............. | 713/157 |
| 6,735,695 B1 * | 5/2004 | Gopalakrishnan et al. | ... | 713/186 |
| 6,785,661 B1 * | 8/2004 | Mandler et al. | ................. | 705/39 |
| 2002/0032653 A1 * | 3/2002 | Schutzer | ........................ | 705/40 |
| 2002/0062438 A1 * | 5/2002 | Asay et al. | .................... | 713/157 |
| 2002/0143584 A1 * | 10/2002 | Lundegren | ...................... | 705/4 |
| 2004/0010698 A1 * | 1/2004 | Rolfe | ............................ | 713/186 |
| 2004/0078246 A1 * | 4/2004 | McCaffrey et al. | ............... | 705/4 |
| 2005/0080716 A1 * | 4/2005 | Belyi et al. | ..................... | 705/38 |

OTHER PUBLICATIONS

Friedman, B. et al., "Trust Online", *Communications of the ACM*, 2000, 43(12), 34-40.

(Continued)

*Primary Examiner* — Michael S McNally
(74) *Attorney, Agent, or Firm* — Timothy Churna; Kate Drakos; Micky Minhas (57) ABSTRACT

A method of assessing risk in an electronic transaction involves assignment of quality attributes to cryptographic identities presented in a digital transaction. The quality assignment supports assessment of risk in the transaction. The evaluation of risk in the transaction is made by assessing machine readable attributes of the digital identities along with transaction details. The digital identity attributes may be constructed using extensions of existing standards. A guarantee against risk of loss may be obtained by procuring insurance on the transaction before execution. Third party insurers may analyze the risk of loss in a transaction by assessing the attributes of digital identities along with transaction details and may provide a requestor with an insurance premium quote. Based on the value of the quote, the transaction participants may decide whether or not to execute the transaction.

11 Claims, 8 Drawing Sheets

(56) References Cited

OTHER PUBLICATIONS

Komar, B. et al., "Planning and Implementing Cross-Certification and Qualified Subordination Using Windows Server 2003", http://www.microsoft.com/technet/prodtechnol/windowsserver2003/plan/ws03qswp.asp?fra . . . , Jan. 18, 2004, 87 pages.

Long, B.W., "Formalising Key Distribution in the Presence of Trust using Object-Z", *Proceeding of the Australasian Information Security Workshop Conference on ACSW Frontiers*, 2003, 21, 59-66.

Abdul-Rahman, A. et al., "A Distributed Trust Model", *Proceedings of the 1997 Workshop on New Security Paradigms*, 1997, 48-60.

Siau, K. et al., "Building Customer Trust in Mobile Commerce", *Communications of the ACM*, 2003, 46(4), 91-94.

Zadeh, J., Ph.D., "Cryptography on the Internet", *Proceedings of the 37th Annual Southeast Regional Conference*, 1999, 45, 5 pages.

Fiducia, "Modelling the Risks in Interoperable Public Key Infrastructures", http://www.dti-mi.org.uk/newweb/fiducia.htm, Nov. 24, 2003, 2 pages.

Management of Information, "Technologies for Fraud Detection, Privacy and Security", http://www.dti-mi.org.uk/newweb/technologies.htm, Nov. 24, 2003, 2 pages.

\* cited by examiner

PRIOR ART

SYSTEM AND METHOD FOR ASSIGNING QUALITY TO CRYPTOGRAPHIC IDENTITIES USED IN A DIGITAL TRANSACTION

FIELD OF THE INVENTION

This invention relates in general to the field of computer security and more particularly to the assignment of quality to cryptographic identities presented in a digital transaction.

BACKGROUND OF THE INVENTION

Digital identities that are issued by common identity issuance mechanisms for proving identity to other participating parties in a digital transaction do not have a means of indicating variations in the amount of risk that they introduce into a transaction from their use. Cryptographically, all identities possess the same characteristics and do not indicate intended use, usage caveats, or quality of the issued identity to the participants in the transaction. These elements are typically reflected in the certification process statement (CPS) from the certification issuer and require a party wishing to determine if a certificate is appropriate for a specific use to read and interpret the CPS. Typically, the CPS is not machine readable and thus is not machine interpretable.

In today's systems, a party participating in a digital transaction assumes the liability for misused certificates, and there is no guarantee that the identities presented by each party in a digital transaction will be issued or maintained under equal security provisions or with the same practices and methods. This is true because individual certificate issuers have differing practices as indicated by their respective CPS. Hence there is a variation in the quality of the identity based on the conditions under which it was granted, stemming from the mechanisms and procedures employed in the management of key material associated with the digital identity and the management practices of the issuer of the identity. With the increased frequency and monetary value of online or electronic transactions, being able to ascertain the conditions under which the certificate (digital identity) issued to a participant in an online transaction was intended to be used and the conditions under which the identity was issued becomes paramount to assignment of risk in using the certificate.

In some type of electronic transactions, a mutual authentication between transaction participants takes place based on certified identities for the parties participating in the transaction. For example, one participant, for example, the consumer, provides a certified identity as the basis for authentication to another party providing some service or good to another participant, for example, a vendor. In this example, the provider of the service or good may be able to assume liability should the transaction not be fulfilled. One missing element in these transactions is the consumer or vendor's capability to determine from the supplied certified identity what the risk is other transaction participant is introducing into the transaction. The ability to present a digital identity is used as a gating factor for access to a service or completion of a transaction. However, the quality of the digital identity being presented by one or both parties may be suspect for many reasons. The digital identity may be stolen or is being used outside the scope of it's procurement purpose. The digital identity may be being used without knowledge of the issuer's willingness to assume liability for the identity's use. Or, the digital identity may have been obtained without the required process that was intended to protect the transaction.

As an example of the latter, cryptographic identities bind public and corresponding private key material to a name or set of attributes. The result of a common enrollment protocol is a X.509 or XrML certificate that indicates a user's name and certifies that the key material that is included in the certificate is indeed possessed by the individuals named in the certificate. Currently, enrollment protocols involve a variety of elements to be checked to indicate the relative strength of the binding of the identity to information about the user at the time of certificate issuance. Some of these elements might consist of an email address, a home address, age, required presentment and inspection of a government issued identity, or other supporting documentation. The number of elements that are checked is in direct correlation to the intended use of the certification and is directly related to the liability assumption of the issuer of the certification for the use of the credentials. As more attributes are verified by the enrollment process the binding grows stronger, and the ensuing quality of the identifier grows as well. However, there is presently no uniform way to indicate the elements of personal or verification information that were required for the enrollment process. There is currently no way to link this same information for some separate agent to provided evaluation of the certificate quality either at the issuer's server or in the client credentials. There is presently no way to perform an evaluation of the information against a transaction participant's established normal requirements for quality of identity produced for a transaction either at the issuer's server, to allow a third party to provide this service, or to perform this evaluation on one of the participating machines in the transaction.

As a consequence, most cryptographic identities appear largely the same in all transactions, regardless of the information that was processed in the registration activity. An assessment of risk is not easy to quantitatively perform in today's electronic transactions based solely on the digital identities exchanged between transaction participants. If the risk is marginally acceptable, there is no way to easily insure an electronic transaction because the risk of loss in a e-commerce transaction using one or more digital identities cannot be easily determined.

Thus, there is a need for a method and system for use in electronic transactions to assess the risk of entering into the transaction as well as to insure against the risk of loss by a party in an electronic transaction. The present invention addresses the aforementioned needs and solves them with additional advantages as expressed herein.

SUMMARY OF THE INVENTION

A method and system of assessing risk in an electronic transaction involves the assignment of quality attributes to cryptographic identities presented in a digital transaction. The quality assignment supports the assessment of risk in the transaction that may be performed by one of the transaction participants or an independent digital identity examining authority. The evaluation of risk allows any one to the transaction participants to decide for themselves whether or not to consummate a proposed electronic transaction. The evaluation of risk in the transaction may be made by reading and assessing machine readable attributes of the digital identities along with transaction details such as cost of the product or service, delivery terms, and history of the transaction participants in similar transactions. The digital identity attributes may be constructed using extensions of existing standards.

The evaluated risk may be assumed by any transaction participant. Alternately, a guarantee against risk of loss may be obtained by procuring insurance for the success of the transaction before the transaction is executed. Thus, third party insurers may analyze the risk of loss in a transaction by assessing the attributes of digital identities along with transaction details and may provide a requestor with an insurance premium quote. Based on the value of the quote, the transaction participants may decide whether or not to execute the transaction.

In a market where electronic transactions may be viewed as commodities and information concerning digital identities and proposed transaction details are provided to multiple insurers, an insurance clearing house may be used to assist the requestor in obtaining the lowest possible premium quote related to an electronic transaction.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Presently issued digital identities, either self-generated or obtained from an identity provider, are not machine readable and are not subject to easy evaluation in the context of an online transaction for goods or services. Presently issued digital identities employ a wide variety of enrolment mechanisms and thus exhibit a wide variation in the types of collected information used as a basis for the certification of the issuing party on the identity provided. Additionally, key material that is the basis for the issued digital identity can be managed, stored, and generated in different fashions without reflecting these varying management, generation or storage mechanisms in the identity. As a result, consumers of the identity may be unsure as to the validity of the identity in relation to the keys that are the basis for the identity.

While some identity providers assume liability for the use of the digital identity that they authorize and issue, others do not. Attributes that may be attached to the CPS cannot be read or used and as such there is currently no automated process that can read this information and calculate its relevance to a proposed transaction.

A general method presented allows for an assessment of risk in a proposed transaction based on machine readable attributes attached to a digital identity or certificate. The use of these attributes assist in an assessment of risk concerning a proposed electronic transaction. The evaluation of risk may be performed by any party in a proposed transaction or may be presented to an examining authority for their evaluation. Additionally, one method includes establishment of insurance for an electronic transaction where liability for a failed transaction can be deferred to the appropriate party or assumed directly by a participant in the transaction. The evaluation of risk in an electronic transaction may be based on the conditions under which a digital identity was issued and intended to be used, along with key management/generation/ and storage mechanisms, client policy, past history for dealing with the other parties, and other pertinent transaction details.

After discussing an exemplary network in conjunction with FIG. 1 in which the invention may be practiced, exemplary methods and embodiments will be discussed in conjunction with FIGS. 3-6. An exemplary computing environment is also discussed in conjunction with FIG. 7.

Exemplary Embodiments of the Invention

Figure 1:
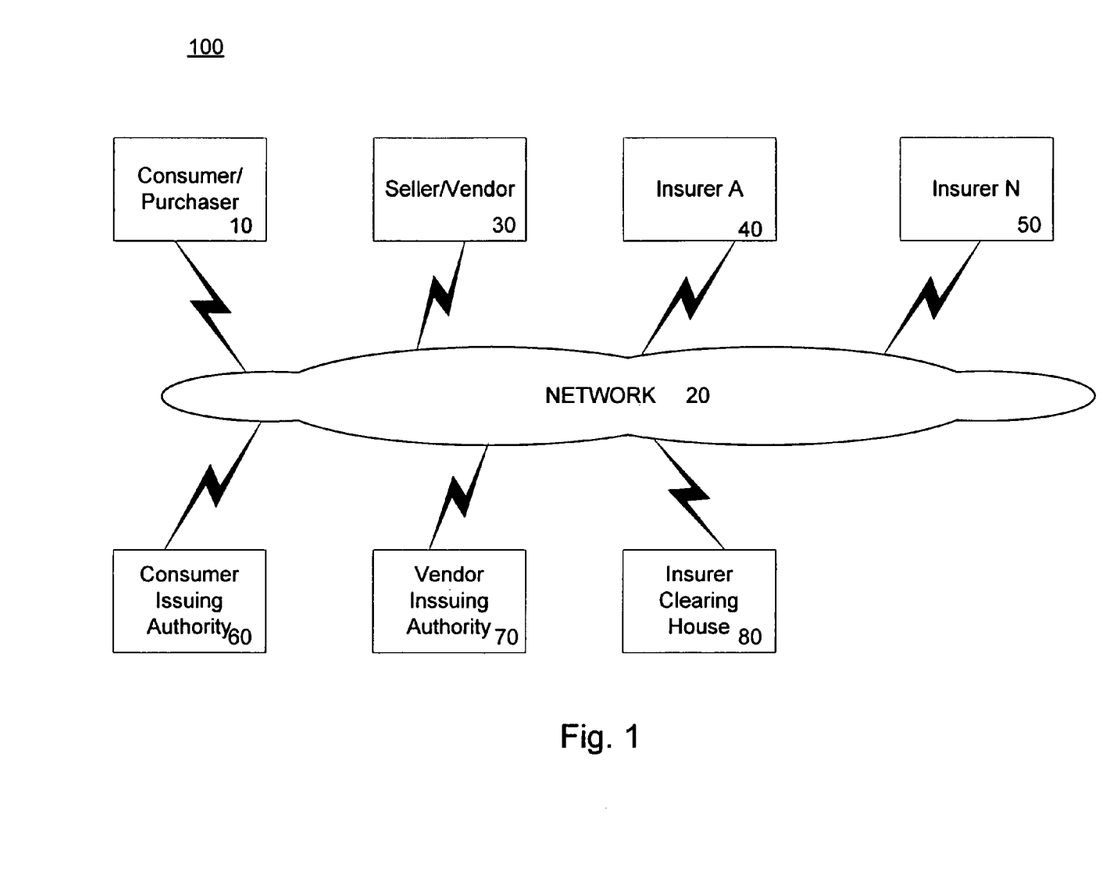
FIG. 1 is a network diagram showing a network system in which aspects of the current invention may be implemented.

FIG. 1 illustrates a networked system 100 showing a consumer or purchaser computing device 10 located as a node on a communications network. Also shown are computing devices for a seller or vendor 30, various insurers A-N (40, 50) certificate issuing authorities 60, 70 and an insurer clearing house indicated as nodes coupled to a communications network 20. The communication network may be any one or more of an internet connection, a wide area network or local area network connection, a telephone communications connection, a hard-line point to point connection, a wireless RF connection, or other equivalent communications means known to those of skill in the art.

In one embodiment, the purchaser 10 may be a purchaser of goods or services. The purchaser 10 may be the end consumer or she may be a business person who intends to re-sell the goods or services provided by a seller or vendor 30. In conducting a network transaction such as an on-line Internet transaction, the transaction participants, the purchaser 10 and seller 30 may exchange certificates of identity obtained a certificate issuing authority. The consumer may have obtained her certificate via one issuing authority 60 and the seller may have obtained an identity certificate via another issuing authority 70. However, the issuing authority could be the same entity. Using aspects of embodiments of the invention, if either the purchaser or seller fails to honor their part of the transaction, an insurer 40, 50 may be utilized to insure the transaction participants from loss. Using an aspect of one embodiment of the invention, an insurer clearing house 80 may be used to facilitate obtaining insurance against failure of the on-line transaction.

Figure 2:
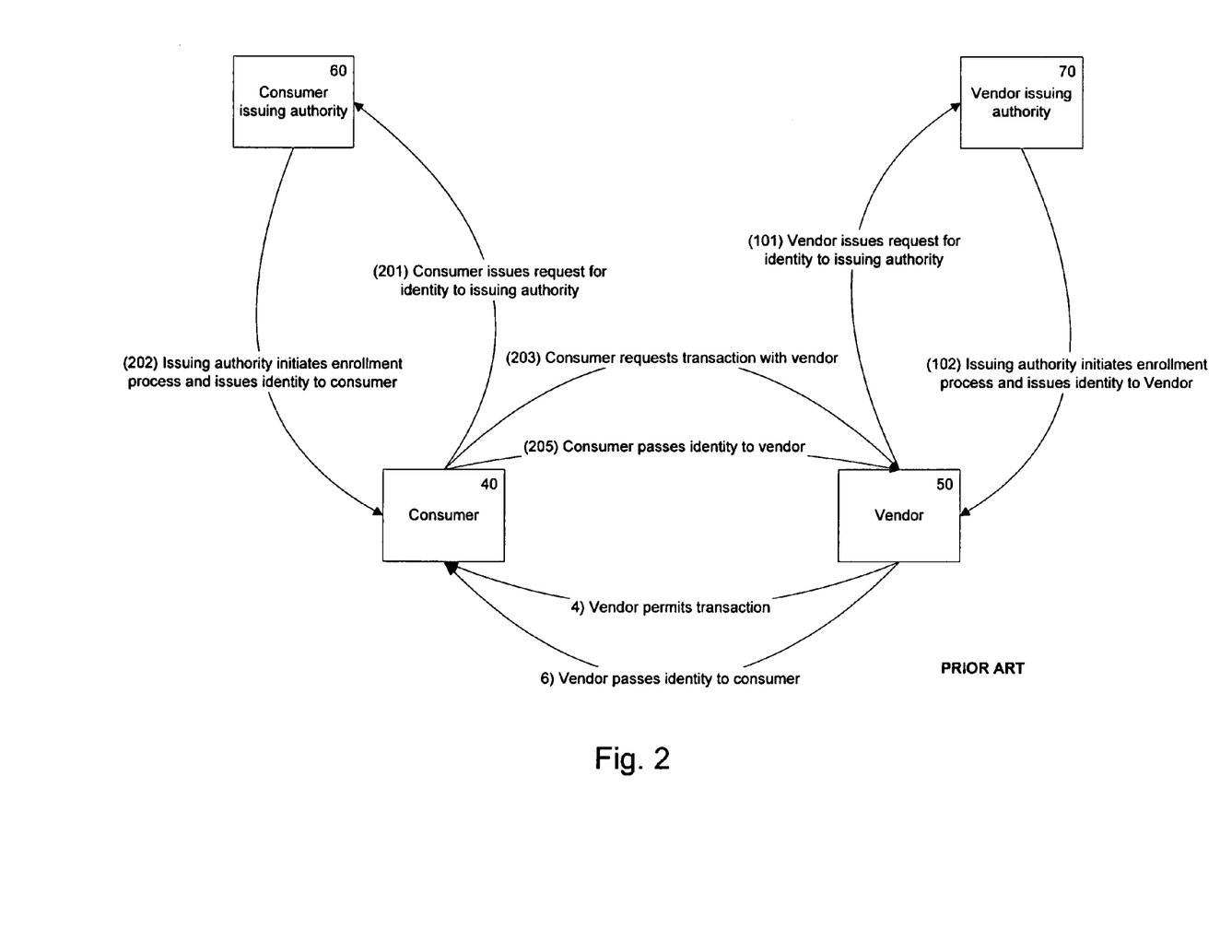
FIG. 2 is a flow diagram showing a prior art technique concerning the use of digital identities.

FIG. 2 depicts a flow diagram of a typical prior art transaction on the internet. A purchaser or consumer 10 requests a verified on-line identity (step 201) from a certificate issuing authority 60. The issuing authority 60 can respond by initiating the enrollment process and issues an identity to the consumer/purchaser. A seller or vendor 30 may make a similar request (step 101) to the same or different certificate issuing authority 70. The issuing authority 70 can issue an identity (step 102) to the vendor 30.

A request for a transaction (step 203) may be initiated by the consumer 10 to the vendor 30 and the vendor may respond (step 204) permitting the transaction. Next, the consumer may pass (step 205) her identity to the vendor and the vendor may pass (step 206) her identity to the consumer. Having accomplished the exchange, both parties are aware of the each other's identity to some ill-defined extent, but likely may have very little knowledge of how well identified the other party is and how that identification process assists in mitigating the risk inherent in an online transaction where the transaction participants may likely never physically meet. At this point the embodiments of the invention discussed herein add mechanisms which can address the assessment of risk in the transaction as well as the possibly of obtaining insurance against failure of at least one party to complete the transaction.

It is observed that participants in an electronic transaction may each have a cryptographic identity without an explicit expression as to the relative risk that the digital identities introduces into the transaction. The risk values present in a digital identity with machine readable attributes can be used to make a more informed decision as to whether to trust or not trust the identity presented. By using machine readable attributes associated with a digital identity, a party trying to determine whether to execute a proposed transaction may be better informed based on concrete values that provide a higher assurance that the transaction will be completed successfully.

Currently available X.509 certificates have an indication of their intended use (Key Usage and Extended Key Usage) values that are placed in the certificate through the issuance process and digitally signed by the issuing authority. This is described in RFC 2459, "Internet X.509 Public Key Infrastructure Certificate and CRL Profile" authored by R. Housley et al. These key usage values are constrained to only the standard values and are described in section 4.2.1.3 and 4.2.1.13 of RFC 2459. As such, an X.509 based certificate can be extended with a custom extension that indicates relative risk values or attributes. These values would be in ASN.1 encoded text corresponding to a value label that was defined by the issuer.

XrML (Extensible Rights Markup Language) based certificates can also be extended with additional attributes. The specific means by which risk attributes could be placed in an XrML based certificate include an extension of the XrML schema for "possess property claims" for a principle, the insertion of a possess property claim consistent with the schema extension, a population of the claim with the desired attribute(s), and a digital signature of the claim or the entire certificate consistent with XrML certification best practices. These attribute extensions are utilized to advantage in embodiments of the invention. Specifically, a consumer can obtain a digital identity from an issuing party using the extensions proposed in embodiments of the invention to indicate a higher level of quality to other potential transaction partners. These extensions would be in the form of a X.509 policy extension with accompanying ASN.1 encoded data will permit the certificate issuer to specify how the certification is intended to be used and those intentions would be evaluated at each use to determine if the use was consistent with the intended use. Alternately, a XML structure can be present in an XrML certification to provide the same facility for evaluation of use against intended use of the certificate.

Figure 3A:
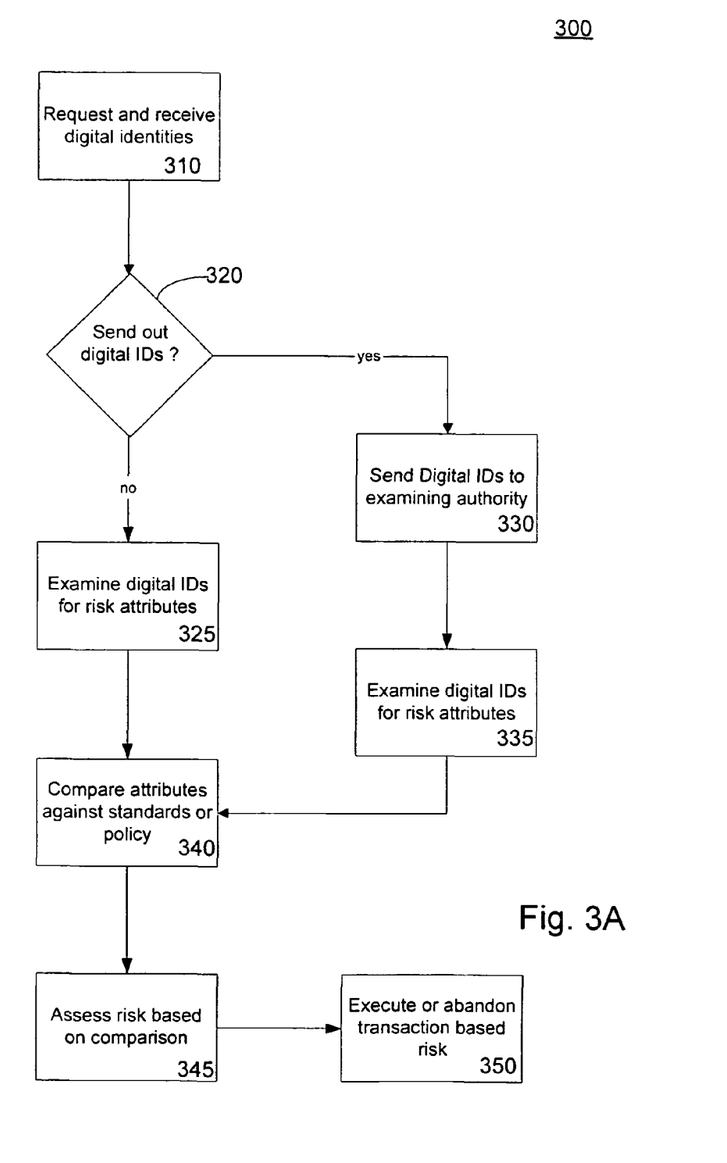
FIG. 3A is a flow diagram depicting an aspect of the invention addressing risk assessment of a digital transaction.

FIG. 3A is a flow diagram 300 illustrating the evaluation of a digital identity in the context of an electronic transaction. Initially, one or more of the potential participants in an electronic or online transactions may seek an evaluation of risk inherent in the transaction. Thus one or more of the potential transaction participants may request and receive digital identities from the other participants (step 310). Digital identities may take the form of a certified practice statement (CPS) certificate. CPS certificates are generally printed documents that are not machine readable. According to one embodiment of the invention, a digital identity may be presented to the a transaction participant in XML format allowing providing a self documenting, machine-readable format for the its contents. The contents of a digital identity may include attributes which are indicative of the quality of the digital identity. For example, an XML coded digital identity may have a list of the items that were used to acquire the digital identity. In addition, the digital identity may have one or more quality indicators. For example, the individual or corporate identity that applied for the digital identity may have presented to the digital identity issuer items that would tend to indicate a unique and definable presence. For a corporation, such items may include a corporate identity, a tax identifier, a corporate state of registry, a key generation method for the digital identity and a key storage method. For an individual, such items may include a personal document that was presented at the time of issuance of the digital identity, a verification that the person was present during the time of issuance of the digital identity and a record that a government issued photo identity was examined. The list of items may be recorded in the digital identity or digital certificate as attributes of the digital identity or attributes of the certificate. Generally, the more items presented at the time of certificate issuance the higher the quality if identification available in the certificate.

Once obtained, the digital identity may be evaluated by the receiving party or the digital identity may be evaluated (step 315) externally by a third party examiner. If evaluated by the transaction participant who requested the digital identity (step 325), then the attributes of the digital identity would be accessed and examined. If the transaction participant who received the digital identity desires a more authoritative examination, the digital identity may be sent (step 330) to an entity that is experienced in examining digital identities. This examining authority may be a digital identity issuer, an agent of an issuer of digital certificates, or some other experienced and trusted party. As part of the information sent to the digital examining authority, specific transaction details which may be helpful in the evaluation of the proposed electronic transaction may be sent by the requestor (step 330). Such additional transaction details may be total transaction cost, number and quality of the goods, shipping address, and conditions under which the goods are to be transferred. Regardless of whether additional transaction details are sent to the digital examining authority, once the authority has received the digital identity information, the examining entity can examine the digital identity (step 335) and extract the attributes.

Regardless of whether a transaction participant or an independent authority examines the digital identity, the attributes may be compared against a standard or against some pre-existing policy (step 340) that reflects an acceptable level of risk for an electronic transaction. For example, in one embodiment, the evaluation can be made such that the risk related attributes are compared against at least one of a standard set of required attributes. For example, the standard set of attributes could be that that, as a minimum, comport with those attributes that were needed by the certificate holder to initially acquire the certificate from the digital identity issuer. The evaluation may also be performed against some larger set of attributes which indicate the expanded set of minimum attribute requirements for a favorable risk evaluation.

This evaluation concept may lead to development of a policy or set of policies for a favorable evaluation. In one embodiment, the evaluation of risk may be made by comparing the risk related attributes against a policy which designates an acceptable level of risk if the risk related attributes match requirements needed to obtain the original digital identity from a digital identity issuer. Alternately the policy may indicate that an acceptable risk may be found if the attributes of the digital identity are the same for the originating party and the transaction participant. Another policy rule that provides for a finding of an acceptable risk is if the electronic transaction value does not exceed a maximum value determined by the evaluators, the transaction participants or other policy setting entity. Another policy rule which may allow a finding of acceptable risk is if there are specific conditions for the delivery of goods and services involved in the electronic transaction. If for example, the goods have to be delivered to the recipient before payment is made, a policy rule may deem the risk evaluation acceptable if the receiving party has a history of good payments. Yet another policy rule may be that the risk evaluator deals only with a specific set of goods with which it is very familiar. The above examples of policy rules are not intended to be exhaustive, but merely exemplary of the types of policy rules that may be implemented in an embodiment of the invention that may allow for quick, automated declarations of risk assessment.

In one embodiment, the risk related items may be evaluated by examining the risk attributes that may indicate a security key management procedure and security key generation procedure used to protect and create security key material that is associated with the digital identity. In another embodiment, the risk related items may be evaluated by reading attributes indicating the intended use of the digital identity. If the intended use of the digital certificate or identity were granted for a limited use, either time or purpose, then attempted use of the certificate outside the permitted use parameters indicated by the attributes may be evaluated as being a high risk. In another embodiment, an evaluation of the risk parameters found in the digital identity may include reading an XML document indicating liability conditions from a certification practice statement. The liability conditions may indicate that a very low level of liability is assumed by the certificate grantor and therefore the guarantees of registration validity are not well established. Having low confidence in the digital certificate may lead to an evaluation that the proposed electronic transaction involves at least one party that is not well identified and the risk evaluation is made accordingly.

Once the comparison of the digital attributes of the digital identity against a set of standards or against a policy rule is made (step 340) and an evaluation is performed, a decision or graduated assessment as to the level of risk is made (step 345). The assessment may be a threshold acceptable or unacceptable indication, or the assessment may be a calculated parameter passed to the requestor of the evaluation. In the former case the assessment may be a consequence of a standard or policy comparison. In the latter case the assessment may be a calculated risk parameter such as a metric on a scale from 1 to 10. In this case the risk parameter may be interpreted as a quality indicator for the digital identity evaluated. Other risk assessment format or conclusion forms known in the art are may be used. After the risk assessment is completed and sent to the requestor of the risk assessment (step 345), the requestor may decide to either accept the risk and proceed with the electronic transaction based on the risk assessment received or the requestor may decide the risk is too great and he may suspend activities on the electronic transaction.

According to an aspect of the current invention, the consumer or vendor or both can request that a third party be involved in the proposed electronic transaction to assume liability for the failure. Thus the consumer or vendor or both may contact a third party insurer directly or provide the insurer with details of the transaction pertinent to their underwriting of the transaction. These details may include but are not limited to the identities involved in the transaction, the value of the transaction, the nature of the goods being bought/sold, the delivery details of the transaction, the involvement of any other underwriters, the amount of expected loss in the case of failure of the transaction, the terms of claim on the underwriting agreement and any pertinent history of dealings between the parties.

The third party insurer may analyze the details consistent with their best practices for determination as to whether they were or were not willing to underwrite the transaction and may determine the appropriate premium to assess consistent with their underwriting if they decide that they are willing to insure the electronic transaction. The insurer may communicate back to the consumer, vendor, or other requestor concerning their risk assessment decision inform the requesting party the insurance premium amount if they are willing to underwrite the electronic transaction. At this point, the transaction participants may then agree to execute or terminate the transaction. If it is agreed to go forward, the requestor can then negotiate (electronically or on the basis of a predefined policy) the payment of the premium. This distribution of payment of the premium may be a method of a vendor discounting the transaction cost for a consumer if they present very high quality (low risk) identities.

Figure 3B:
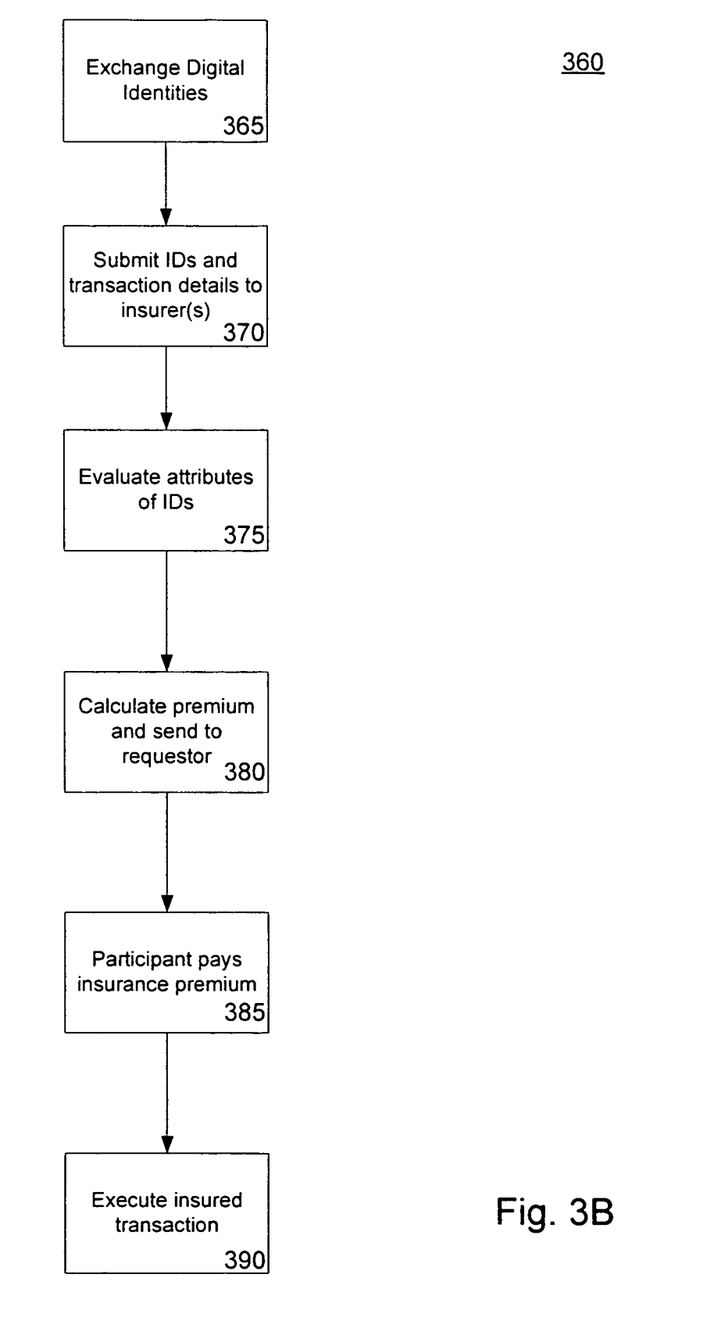
FIG. 3B is a flow diagram depicting an aspect of the invention addressing electronic transaction insurance.

FIG. 3B is a flow diagram 360 illustrating the evaluation of a digital identity and transaction details in the context of an electronic transaction which may be insured. Initially, one or more of the potential participants in an electronic or on line transactions may seek an evaluation of risk in the transaction and a premium quote for insurance against the risk loss in the proposed electronic transaction. As a first step the participants in the transaction may exchange (step 365) digital identities or digital certificates having attributes. These attributes may be indicative of the risk associated with doing business with the identity holder.

One or more of the transaction participants may then submit (step 370) the received digital identities along with transaction details to an transaction insurer. The transaction participant that submits the digital identities of the proposed transaction may be a purchaser, a seller, or any other transaction participant in the proposed transaction. In one embodiment, the seller of goods or services submits the digital identities and transaction details to a transaction insurer as a pre-requisite to consummating the transaction. In this instance, the seller may ask the other transaction participants to allow the seller to submit the information on behalf of all involved in the transaction. However, this embodiment is not limiting as any transaction participant may submit the above stated information. Indeed, multiple parties may wish to submit the same information to one or more transaction insurers so as to protect their portion of the proposed transaction.

Submitting the digital identities and transaction details to an transaction insurer may be performed in a myriad of ways. In one embodiment, the receiver of the digital identity and transaction detail information may be a supplier of insurance products that is favored by the participant seeking insurance. The information may be transmitted as an e-commerce transaction between two businesses. In another embodiment, the submission of information (step 370) may be made to a single location where multiple suppliers of insurance may access the submitted information and bid on the request for insurance for the transaction based on the information provided in the submittal. In this case the central location may be a web-site or other online destination where an insurance industry clearing house may input information from entities requesting insurance for online transactions.

Once the transaction insurer receives the submitted information, one or more insurance providers or brokers for insurance providers may conduct an evaluation (step 375) of the data contained in the information submission. As presented above with reference to FIG. 3A, the digital identity attributes may be evaluated for quality. These results may be then used along with the transaction details, such as cost of goods, to determine the suitability of the proposed transaction for insurance coverage. Once the transaction appears to be insurable, the transaction insurer may calculate (step 380) an insurance premium for the proposed transaction and provide that premium information back to the requestor of insurance.

There may be multiple ways that the insurance premium information may be returned to the requestor. In one embodiment, the information may be sent directly to the requestor via a compatible e-commerce channel from which the original request was received. In another embodiment, if the transaction was sent to a central location for multiple insurance providers, such as an insurance clearing house, then the information may be processed and formatted by the clearing house to be later forwarded onto the requestor, or the information may be placed in a secure online location by the clearing house for the requestor to access at her discretion. Using either embodiment, the requestor may receive one or more quotes for insurance and decide which one best fits her requirements for insuring the proposed transaction. After the requestor decides on a quote, then the requestor may authorize payment of the quoted premium to obtain insurance for the proposed transaction (step 385). Once insurance for the transaction is procured, the underlying electronic transaction may be executed (step 390).

Figure 4:
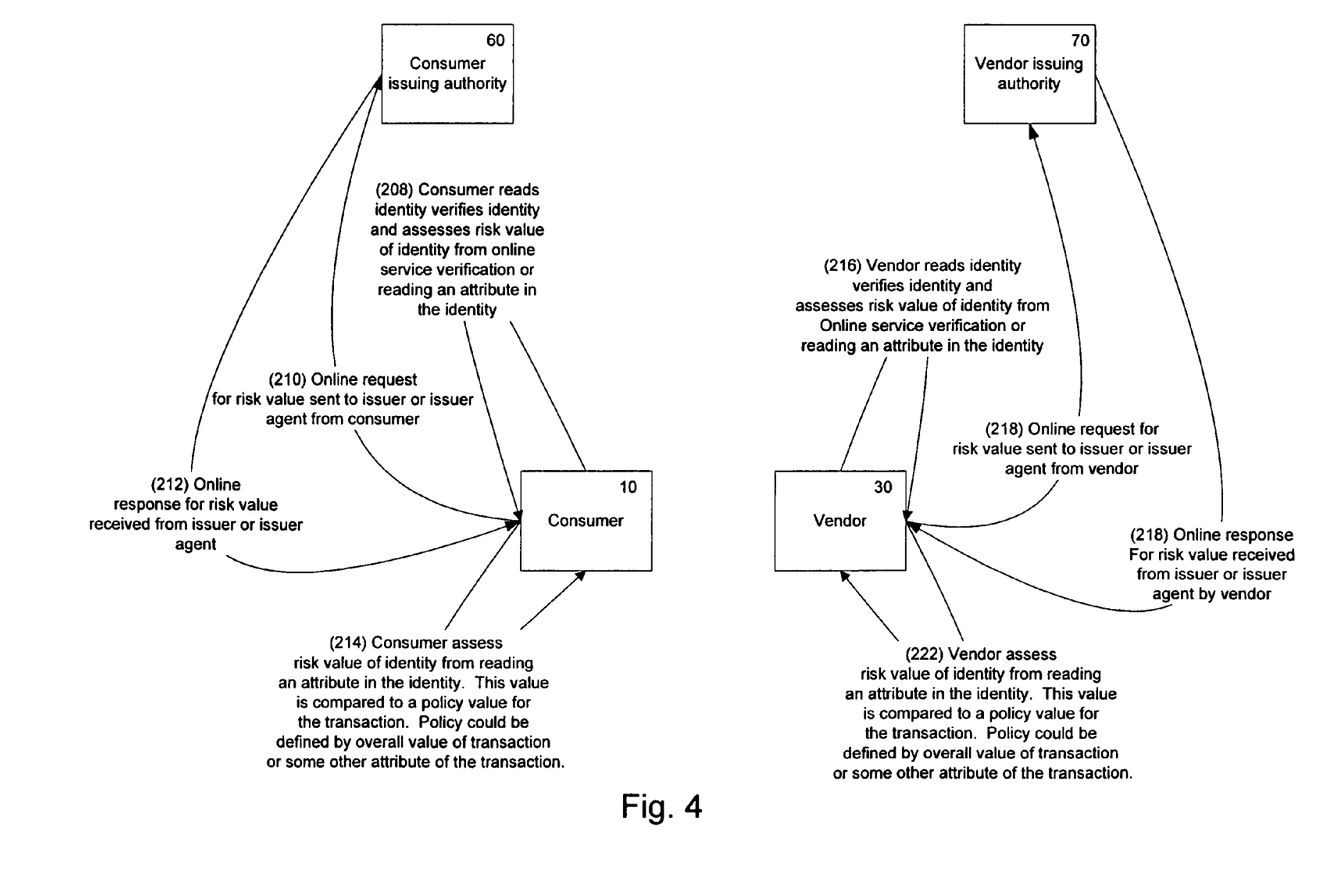
FIG. 4 is a flow diagram depicting an embodiment addressing the risk assessment aspect of the invention.

FIG. 4 depicts one embodiment of the invention demonstrating how a risk assessment may be made given well defined attributes of issued digital identity certificates. Given the both a consumer 10 and a vendor 30 have obtained digital identities and have shared them with each other in the context of a potential well defined transaction, an assessment of the risk of the transaction may be made. One method of assessing risk by either party may be to read the identity certificate provided by the certificate issuing authority (step 208, 216). Using this technique the consumer 10 or vendor 30 may be able to get some sense of the risk of the involved in entering the transaction by examining the attributes of the digital identity certificate. For example, if the entity who owns the certificate only had to submit a minimal amount of identifying data to obtain the certificate, then less trust in the viability of the transaction may result than if the certificate applicant had to personally show detailed identification records and provide a detailed credit history. In the latter case, there may be less risk in the transaction because the certificate holder has good and verifiable identity information and also has a history of good transactions dealings.

As an alternate approach, a third party may be willing to make to make the assessment for the consumer or vendor. In the case of the consumer, she may submit (step 210) the identity certificate she received from the vendor to an issuer of certificates 60. In the immediate example, the consumer may submit the vendors certificate to her own certificate issuing authority 60 for evaluation. Her certificate issuer, or an agent of her certificate issuer may be able to credibly evaluate the validity and strength of the vendor certificate for the consumer and provide a response (step 212) to the consumer concerning the validity of the certificate and an assessment of risk in the transaction. In this case, the consumer 10 may have sent both the vendor certificate and one or more transaction parameters, such as the total value of the transaction to the issuing authority 60 for evaluation.

Similarly, the vendor 30 may take the consumers certificate that was sent to the vender and send it (step 218) to her certificate issuing authority 70 or its agent for a validity and risk assessment. The result may be an online response (step 222 which indicates to the vendor 30 a level of risk associated with the proposed online transaction.

An alternative to sending a received certificate to the an issuer or an issuers agent is to read and compare (step 214) or (step 220), the certificate attributes and compare the attributes and at least some proposed transaction data against a standard. The standard may be a policy value for the transaction. For example, for a transaction of less than $100, a minimum number of identity attributes may be required. For transactions above $1,000, the minimum amount of identity attributes plus some additional verification may be required to have obtained the certificate such as the personal presentation of a government issued identity and a credit history. For transactions above $10,000 dollars, the $1000 level of verification may be needed with additional details including detailed transactions history and asset identification to act as collateral if needed. This tiered example is merely exemplary and the policy standard developed may vary and still be in keeping with the tenants of the embodiment which are that a stronger set of attributes would be required for higher dollar values of transactions.

Figure 5:
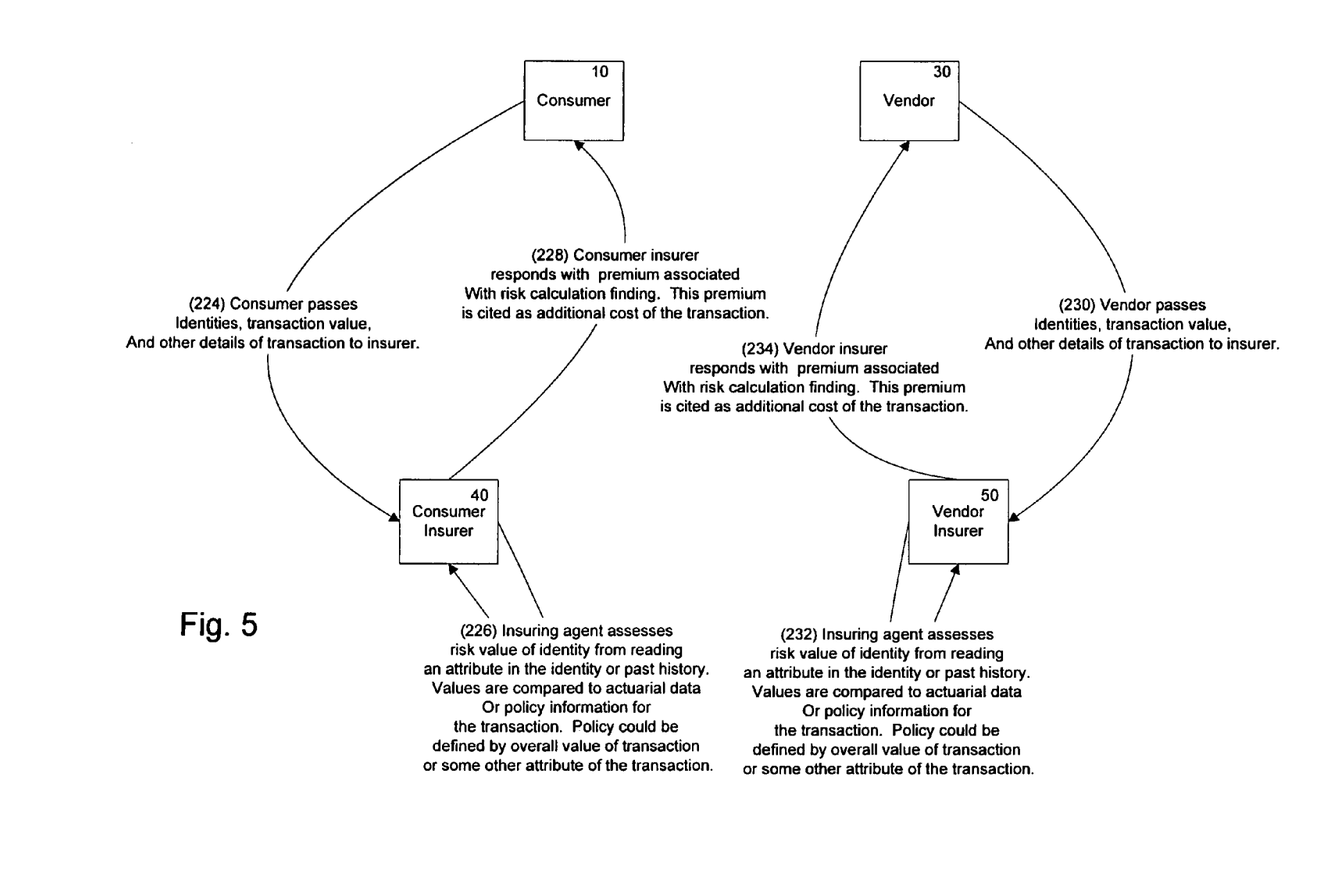
FIG. 5 is a flow diagram depicting an embodiment addressing an insurance aspect of the current invention.

FIG. 5 depicts a flow diagram incorporating one embodiment of the invention where the online transaction may become an insured transaction. Given that both the consumer 10 and vendor 30 have obtained digital identity certificates and exchanged them, then the two parties may be at a point where they both understand the parameters of the transaction enough that a risk assessment may be made before entering execution of the transaction. Starting with the consumer 10, the consumer wish to determine the risk of the proposed online transaction and insure the success of the transaction against failure to perform by either party. The consumer may transmit (step 224) the digital identity certificate, transaction value and other transaction details to an insurer 40. The insurer or an insurer agent 40 may assess the risk value by reading the attributes of the identity certificates of the vendor or the vendor and the consumer. The insurer may obtain additional information as needed to, such as past history or credit reports, and use actuarial tables or policy information to assess the risk of the proposed transaction. Using all of the information and resources at their disposal, the insurer 40 may decide that the transaction is insurable and may establish a premium associated with the transaction. The insurer 40 may then respond (step 228) to the consumer with premium information. The consumer 10 may then decide to engage in the transaction based on the value of the premium imposed.

Similarly, the vendor may wish to investigate the risk of the proposed transaction with the consumer and may wish to insure against loss. The vendor may transmit (step 230) the digital identity certificate, transaction value and other transaction details to an insurer 50. The insurer or an insurer agent 50 may assess the risk value (step 232) in a similar manner to that stated above by reading the, attributes of the submitted certificates and consulting insurer resources such as actuarial tables. The insurer 50 may respond (step 234) to the vendor 30 with an insurance premium associated with the transaction.

It should be noted that only one of the parties, or both parties may choose to insure the transaction. Preferably, only one party would ensure the transaction against loss. Generally, the party with the lower quality digital certificate may be asked by the other party to insure the transaction before the higher quality certificate holder will enter into the transaction. In one embodiment, a party, such as a vendor, who requires that a transaction be executed only after the consumer pays a transaction insurance premium, may have a special relationship with an insurer and consequently ask the consumer to pay an insurance premium that was determined by the vendor's insurer. This situation may be preferable in instances where a single consumer may not have a special relationship with any insurer and is willing to accept the cost of insurance from a well established vendor.

Extending the above description of involvement of third party insurers to a different embodiment, a market could be established that would rely on the consumer or vendor not contacting an insurer directly but instead detailing the pertinent data about the transaction as a "commodity" that could be bid upon by a variety of insurers. The advantage may be that the requestor may obtain the lowest possible premium for insuring the transaction as market conditions permit. In this embodiment, the "commodity", digital identities and the transaction data along with potential details of the desired underwriting agreement, may be posted into an insurance clearinghouse and the insurers would bid on those commodities that they thought they could satisfy. Since there will likely be one or more insurer, the premium associated with the underwriting of the transaction may be driven down, resulting in lower overall premium cost.

Figure 6:
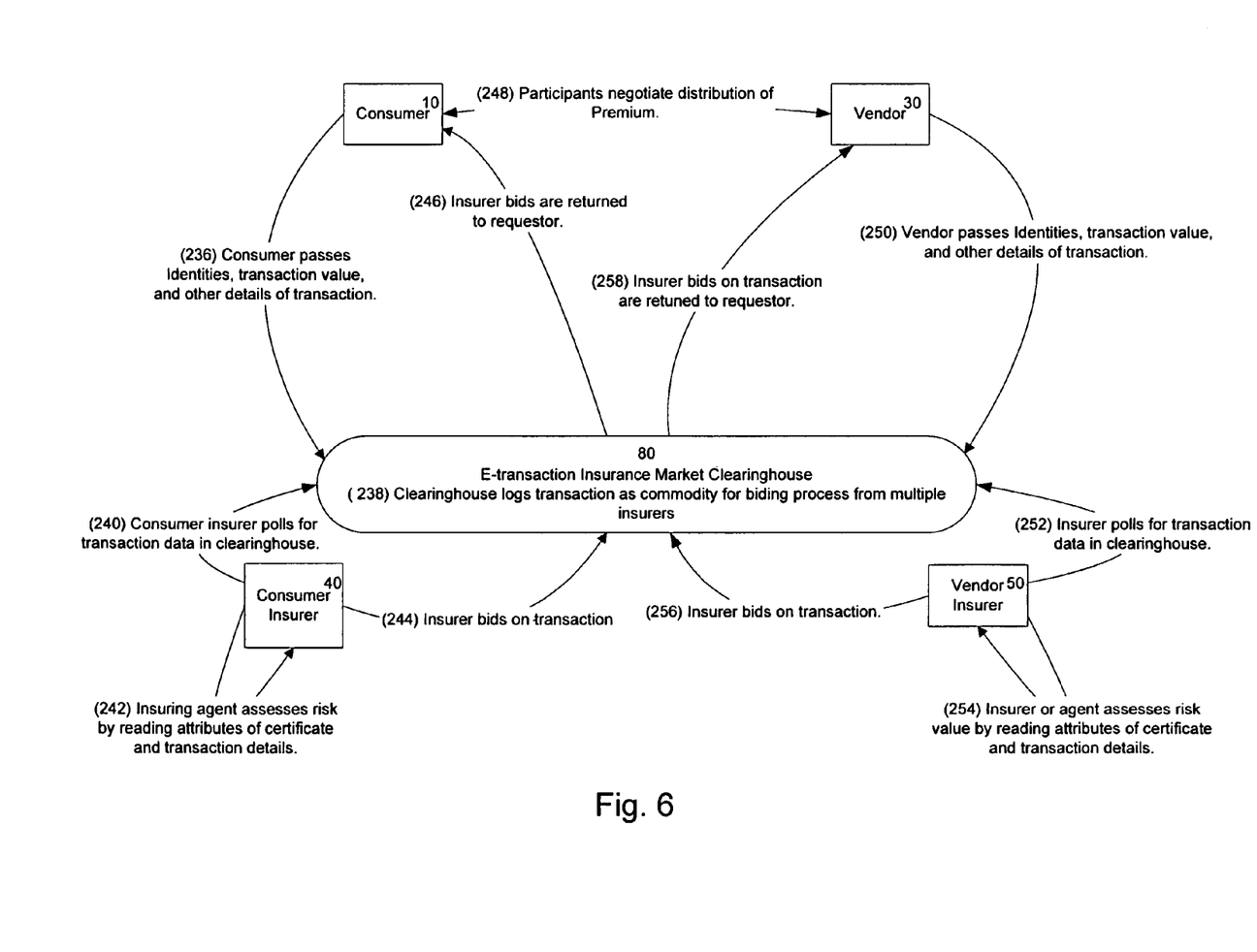
FIG. 6 is a flow diagram depicting an embodiment addressing the use of multiple insurance carriers according to an aspect of the invention.

Thus, in cases where neither party has a firm relationship with a specific insurer or where the parties may wish to find the lowest available premium for a proposed electronic transaction, an insurance clearing house may be used. FIG. 6 depicts a flow diagram of an embodiment where an e-transaction insurance market clearing house may operate as an insurer of an online transaction. If an consumer 10 is the transaction participant that is seeking insurance, the consumer 10 may pass the digital identities or certificates along with transaction parameters such as total value of the transaction to a insurance market clearing house 80 or other entity that essentially brokers insurance. The clearing house 80 or other broker may treat the transaction details, along with the digital identities and corresponding attributes as a package of information representing a commodity for a bidding process for multiple insurers.

In a specific instance the consumer insurer 40, along with potentially other insurers, may poll (step 240) the clearing house for a transaction data package. The consumer insurer or agent may then assess (step 242) the risk in the online transaction by assessing the attributes of the digital identity certificate. The transaction parameter data such as total transaction value may also be used in the assessment. The insurer may have insurance market resources and may be able to find past history, credit records, or a policy foundation to use in assessing risk. A policy foundation may be established such that for a transaction of a specific dollar value and a digital certificate of a given quality, a transaction may have a certain level of risk. Using actuarial tables and other resources of the insurance industry, the consumer insurer may bid (step 244) on the transaction and pass the bid back to the clearing house which can then assemble the bids and return the quotes (step 246) to the consumer for his review. Alternately, the clearing house may offer the service of selecting the top lowest bids for presentment to the consumer 10.

Once the consumer 10 has the bid or bids, she may share the information with the vendor 30. The two parties may then negotiate distribution of the premium if the premium is to be split, and agree to accept an insurance bid, pay the premium, and execute the underlying online transaction.

In an alternate embodiment, the vendor 30 may be the transaction participant that seeks to insure the transaction against failure of the consumer to complete the transaction. In this instance the vendor 30 may pass the digital identities (step 250) of the transaction participants along with the other transaction details to an insurance clearing house 80. The insurance clearing house may distribute the transaction data package or may allow its member insurers to poll for the transaction data (step 252). In one instance the vendor insurer, or another insurers may assess the risk of the transaction by reading the digital certificate attributes and transaction details (step 254). Based on insurance standards and actuarial tables, the insurer may place a bid on the online transaction and provide that information back to the clearing house 80. The clearing house may then assemble and present the bids (step 258) to the vendor for his consideration.

As before, after one or more bids are received, a decision may be made as to the acceptability of the risk of the transaction based partially upon the premium value and other considerations and the transaction participants may pay the premium and execute the transaction. It should be noted that the underlying transaction may be between multiple transaction parties. Although only two transaction parties are shown in the exemplary embodiments of FIGS. 2-6, the underlying transaction may be between multiple participants.

Exemplary Computing Device

Figure 7:
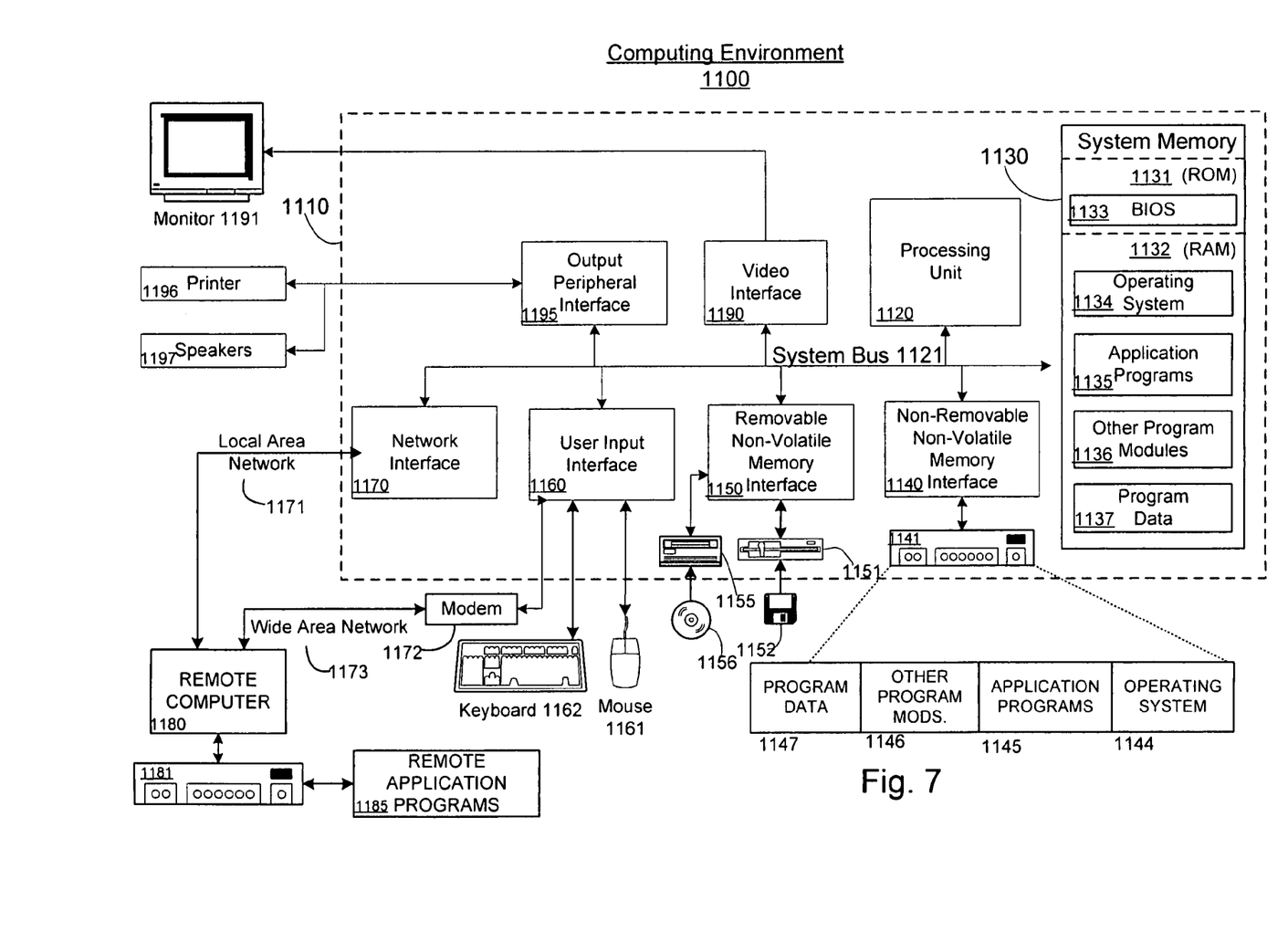
FIG. 7 is a block diagram showing an exemplary computing environment in which aspects of the invention may be implemented.

FIG. 7 and the following discussion are intended to provide a brief general description of a suitable computing environment in which embodiments of the invention may be implemented. It should be understood, however, that handheld, portable and other computing devices and computing objects of all kinds are contemplated for use in connection with embodiments of the invention. Thus, while a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 7 thus illustrates an example of a suitable computing system environment 700 in which the embodiments of the invention may be implemented, although as made clear above, the computing system environment 700 is only one example of a suitable computing environment and is not intended to suggest any limitation as to the scope of use or functionality of an embodiment of the invention. Neither should the computing environment 700 be interpreted as having any dependency or requirement relating to any one or combination of components illustrated in the exemplary operating environment 700.

With reference to FIG. 7, an exemplary system for implementing an embodiment of the invention includes a general purpose computing device in the form of a computer system 710. Components of computer system 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 710 typically includes a variety of computer readable media. Computer readable media can be any available media that can be accessed by computer system 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer system 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer system 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer system 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer system 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790, which may in turn communicate with video memory (not shown). In addition to monitor 791, computer systems may also include other peripheral output devices such as speakers 797 and printer 796, which may be connected through an output peripheral interface 795.

The computer system 710 may operate in a networked or distributed environment using logical connections to one or more remote computers, such as a remote computer 780. The remote computer 780 may be a personal computer, a server, a router, a network PC, a peer device or other common network node, and typically includes many or all of the elements described above relative to the computer system 710, although only a memory storage device 781 has been illustrated in FIG. 7. The logical connections depicted in FIG. 7 include a local area network (LAN) 771 and a wide area network (WAN) 773, but may also include other networks/buses. Such networking environments are commonplace in homes, offices, enterprise-wide computer networks, intranets and the Internet.

When used in a LAN networking environment, the computer system 710 is connected to the LAN 771 through a network interface or adapter 770. When used in a WAN networking environment, the computer system 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer system 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement risk evaluation as part of an electronic transaction. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of an embodiment of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed embodiments of the invention. Additionally, any storage techniques used in connection with an embodiment may invariably be a combination of hardware and software.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:
1. A method comprising:
evaluating a quality attribute of machine-readable digital certificate to assess a quality of the digital certificate, the quality attribute comprising the identity of at least one item that was provided to a certifying authority in order to obtain the digital certificate; and
evaluating a second attribute indicating an intended use of the digital certificate to determine a risk associated with the digital certificate, the second attribute indicating the intended use of the digital certificate comprising an indication of an amount of time the digital certificate will be used.

2. The method of claim 1, further comprising:
evaluating the quality attribute by using a policy that is based on at least one requirement having been satisfied in order to obtain the digital certificate.

3. The method of claim 1, further comprising: examining a list of items that were used to acquire the digital certificate to evaluate a risk involved in accepting the digital certificate for consummating an electronic transaction.

4. The method of claim 3, the list of items comprising at least one of a corporate identity, a tax identifier, a corporate state of registry, a key generation method, or a key storage method.

5. The method of claim 3, the list of items comprising at least one of a security key management procedure or a security key generation procedure used to protect and create security key material associated with the digital certificate.

6. The method of claim 3, the list of items comprising at least one requirement that was used during an initial registration process for key generation.

7. A system comprising:
a processor having access to memory, the memory having instructions which, when executed, perform the method comprising:
evaluating a quality attribute of a machine-readable digital certificate to assess a quality of the digital certificate, the quality attribute comprising the identity of at least one item that was provided to a certifying authority in order to obtain the digital certificate; and
evaluating a second attribute indicating an intended use of the digital certificate to determine a risk associated with the digital certificate, the second attribute indicating the intended use of the digital certificate comprising an indication of an amount of time the digital certificate will be used.

8. The system of claim 7, further comprising:
transmitting the digital certificate to an examining authority after receiving the digital certificate such that the authority performs the evaluating.

9. The system of claim 7, further comprising:
executing the electronic transaction based at least in part upon the assessed quality of the digital certificate.

10. A memory having computer-executable instructions stored thereon that, when executed by a processor, cause the processor to effectuate operations comprising:
evaluating a quality attribute of a machine-readable digital identity to assess a quality of the digital identity, the quality attribute comprising the identity of at least one item that was provided to a certifying authority in order to obtain the digital identity; and
evaluating a second attribute indicating an intended use of the digital identity to determine a risk associated with the digital identity, the second attribute indicating the intended use of the digital certificate comprising an indication of an amount of time the digital certificate will be used.

11. A system comprising:
a processor having access to memory, the memory having instructions which, when executed, perform the method comprising:
evaluating a quality attribute of a machine-readable digital certificate to assess a quality of the digital certificate, the quality attribute comprising the identity of at least one item of a list of items that was were provided to a certifying authority in order to obtain the digital certificate, the list of items comprising at least one of a corporate identity, a tax identifier, a corporate state of registry, a key generation method, a key storage method, a security key management procedure or a security key generation procedure used to protect and create security key material associated with the digital certificate, or at least one requirement that was used during an initial registration process for key generation;
examining the list of items that were used to acquire the digital certificate to evaluate a risk involved in accepting the digital certificate for consummating an electronic transaction; and
evaluating a second attribute indicating an intended use of the digital certificate to further evaluate the risk associated with the digital certificate.

* * * * *